US00RE42690E

(19) United States
(12) Reissued Patent
Aviv

(10) Patent Number: US RE42,690 E
(45) Date of Reissued Patent: Sep. 13, 2011

(54) ABNORMALITY DETECTION AND SURVEILLANCE SYSTEM

(75) Inventor: David G. Aviv, Los Angeles, CA (US)

(73) Assignee: Prophet Productions, LLC, New York, NY (US)

(21) Appl. No.: 12/466,340

(22) Filed: May 14, 2009

Related U.S. Patent Documents

Reissue of:
(64) Patent No.: 6,028,626
Issued: Feb. 22, 2000
Appl. No.: 08/898,470
Filed: Jul. 22, 1997

U.S. Applications:
(63) Continuation-in-part of application No. 08/367,712, filed on Jan. 3, 1995, now Pat. No. 5,666,157.

(51) Int. Cl.
*H04N 7/18* (2006.01)
(52) U.S. Cl. ..... 348/152; 382/118; 706/933
(58) Field of Classification Search ..... 348/143, 348/152, 148
See application file for complete search history.

(56) References Cited

U.S. PATENT DOCUMENTS

| | | | | |
|---|---|---|---|---|
| 4,337,482 | A | 6/1982 | Coutta | |
| 4,692,806 | A * | 9/1987 | Anderson et al. | 375/240.08 |
| 4,737,847 | A | 4/1988 | Araki et al. | |
| 5,091,780 | A | 2/1992 | Pomerleau | |
| 5,097,328 | A | 3/1992 | Boyette | |
| 5,126,577 | A * | 6/1992 | Trent | 250/495.1 |
| 5,283,644 | A | 2/1994 | Maeno | |
| 5,396,252 | A * | 3/1995 | Kelly | 342/94 |
| 5,512,942 | A | 4/1996 | Otsuki | |
| 5,519,669 | A * | 5/1996 | Ross et al. | 367/93 |
| 5,546,072 | A | 8/1996 | Creuseremee et al. | |
| 5,666,157 | A | 9/1997 | Aviv | |
| 5,747,719 | A * | 5/1998 | Bottesch | 89/1.1 |
| 5,809,161 | A | 9/1998 | Auty et al. | |
| 6,028,626 | A | 2/2000 | Aviv | |

FOREIGN PATENT DOCUMENTS

IL 116647 3/1999

OTHER PUBLICATIONS

D.G. Aviv, "On Achieving Safer Streets," Library of Congress, TXU 545 919, Nov. 23, 1992, 7 pages.
D.G. Aviv, "The 'Public Eye' Security System," Library of Congress, TXU 551 435, Jan. 11, 1993, 13 pages.
U.S. Appl. No. 12/466,350, filed May 14, 2009, Aviv.

(Continued)

*Primary Examiner* — Nhon Diep
(74) *Attorney, Agent, or Firm* — Sheridan Ross P.C.

(57) ABSTRACT

A surveillance system having at least one primary video camera for translating real images of a zone into electronic video signals at a first level of resolution. The system includes means for sampling movements of an individual or individuals located within the zone from the video signal output from at least one video camera. Video signals of sampled movements of the individual is electronically compared with known characteristics of movements which are indicative of individuals having a criminal intent. The level of criminal intent of the individual or individuals is then determined and an appropriate alarm signal is produced.

42 Claims, 6 Drawing Sheets

OTHER PUBLICATIONS

Agarwal et al. "Estimating Optical Flow from Clustered Trajectory Velocity Time" Pattern Recognition, 1992. vol. I. Conference A: Computer Vision and Applications, Proceedings., 11th IAPR International Conference on Aug. 30-Sep. 3, 1992, pp. 215-219.
Aviv "New on-board data processing approach to achieve large compaction," SPIE, 1979, vol. 180, pp. 48-55.
Bergstein et al. "Four-Component Optically Compensated Varifocal System," Journal of the Optical Society of America, Aprl. 1962, vol. 52, No. 4, pp. 376-388.
Bergstein et al. "Three-Component Optically Compensated Varifocal System," Journal of the Optical Society of America, Apr. 1962, vol. 52, No. 4, pp. 363-375.
Bergstein et al. "Two-Component Optically Compensated Varifocal System," Journal of the Optical Society of America, Apr. 1962, vol. 52, No. 4, pp. 353-362.
Rabiner "Applications of Voice Processing to Telecommunications," Proceedings of the IEEE, Feb. 1994, vol. 82, No. 2, pp. 199-228.
Rabiner et al. "Fundamental of Speech Recognition," Prentice Hall International, Inc., Apr. 12, 1993, pp. 434-495.
Rabiner "The Role of Voice Processing in Telecommunications," 2nd IEEE Workshop on Interactive Voice Technology for Telecommunications Applications (IVTTA94) Sep. 1994, 8 pages.
Shio et al. "Segmentation of People in Motion," Visual Motion, 1991., Proceedings of the IEEE Workshop on Oct. 7-9, 1991, pp. 325-332.
Suzuki et al. "Extracting Non-Rigid Moving Objects by Temporal Edges,"Pattern Recognition, 1992. vol. I. Conference A: Computer Vision and Applications, Proceedings., 11th IAPR International Conference on Aug. 30-Sep. 3, 1992, pp. 69-73.
Weibel et al. "Readings in Speech Recognition," Morgan Kaufam, May 15, 1990 pp. 267-296.
International Search Report for International (PCT) Patent Application No. PCT/US1996/08674, dated Sep. 17, 1996.
Official Action for U.S. Appl. No. 12/466,350 mailed Mar. 15, 2010.
Official Action for U.S. Appl. No. 12/466,350 mailed Dec. 22, 2010.
Official Action for U.S. Appl. No. 08/898,470, mailed Oct. 1, 1998.
Notice of Allowance for U.S. Appl. No. 08/898,470, mailed Mar. 1, 1999.
Official Action for U.S. Appl. No. 08/367,712, mailed Jul. 24, 1996.
Notice of Allowance for U.S. Appl. No. 08/367,712, mailed Dec. 24, 1996.

* cited by examiner

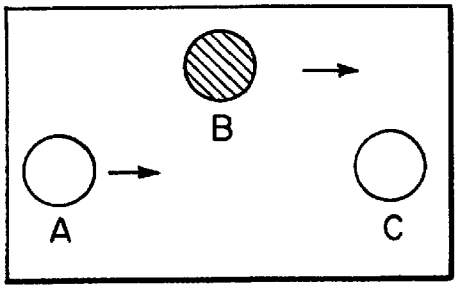
FIG. 3A
FIG. 3B
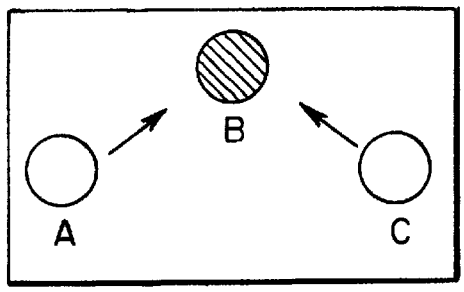
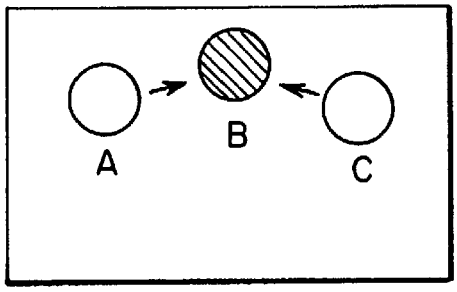
FIG. 3C
FIG. 3D
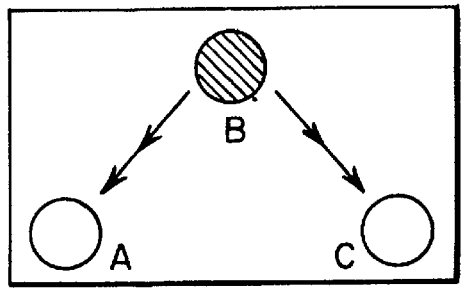

ABNORMALITY DETECTION AND SURVEILLANCE SYSTEM

Matter enclosed in heavy brackets [ ] appears in the original patent but forms no part of this reissue specification; matter printed in italics indicates the additions made by reissue.

CROSS-REFERENCE TO COPENDING PATENT APPLICATION

This is a continuation in part of patent application Ser. No. 08/367,712, filed Jan. 3, 1995, now U.S. Pat. No. 5,666,157.

BACKGROUND OF THE INVENTION

A) Field of the Invention

This invention generally relates to surveillance systems, and more particularly, to trainable surveillance systems which detect and respond to specific abnormal video and audio input signals.

B) Background of the Invention

Today's surveillance systems vary in complexity, efficiency and accuracy. Earlier surveillance systems use several closed circuit cameras, each connected to a devoted monitor. This type of system works sufficiently well for low-coverage sites, i.e., areas requiring up to perhaps six cameras. In such a system, a single person could scan the six monitors, in "real" time, and effectively monitor the entire (albeit small) protected area, offering a relatively high level of readiness to respond to an abnormal act or situation observed within the protected area. In this simplest of surveillance systems, it is left to the discretion of security personnel to determine, first if there is any abnormal event in progress within the protected area, second, the level of concern placed on that particular event, and third, what actions should be taken in response to the particular event. The reliability of the entire system depends on the alertness and efficiency of the worker observing the monitors.

Many surveillance systems, however, require the use of a greater number of cameras (e.g., more than six) to police a larger area, such as at least every room located within a large museum. To adequately ensure reliable and complete surveillance within the protected area, either more personnel must be employed to constantly watch the additionally required monitors (one per camera), or fewer monitors may be used on a simple rotation schedule wherein one monitor sequentially displays the output images of several cameras, displaying the images of each camera for perhaps a few seconds. In another prior art surveillance system (referred to as the "QUAD" system), four cameras are connected to a single monitor whose screen continuously and simultaneously displays the four different images. In a "quaded quad" prior art surveillance system, sixteen cameras are linked to a single monitor whose screen now displays, continuously and simultaneously all sixteen different images. These improvements allow fewer personnel to adequately supervise the monitors to cover the larger protected area.

These improvements, however, still require the constant attention of at least one person. The above described multiple-image/single screen systems suffered from poor resolution and complex viewing. The reliability of the entire system is still dependent on the alertness and efficiency of the security personnel watching the monitors. The personnel watching the monitors are still burdened with identifying an abnormal act or condition shown on one of the monitors, determining which camera, and which corresponding zone of the protected area is recording the abnormal event, determining the level of concern placed on the particular event, and finally, determining the appropriate actions that must be taken to respond to the particular event.

Eventually, it was recognized that human personnel could not reliably monitor the "real-time" images from one or several cameras for long "watch" periods of time. It is natural for any person to become bored while performing a monotonous task, such as staring at one or several monitors continuously, waiting for something unusual or abnormal to occur; something which may never occur.

As discussed above, it is the human link which lowers the overall reliability of the entire surveillance system. U.S. Pat. No. 4,737,847 issued to Araki et al. discloses an improved abnormality surveillance system wherein motion sensors are positioned within a protected area to first determine the presence of an object of interest, such as an intruder. In the system disclosed by U.S. Pat. No. 4,737,847, zones having prescribed "warning levels" are defined within the protected area. Depending on which of these zones an object or person is detected in, moves to, and the length of time the detected object or person remains in a particular zone determines whether the object or person entering the zone should be considered an abnormal event or a threat.

The surveillance system disclosed in U.S. Pat. No. 4,737,847 does remove some of the monitoring responsibility otherwise placed on human personnel, however, such a system can only determine an intruder's "intent" by his presence relative to particular zones. The actual movements and sounds of the intruder are not measured or observed. A skilled criminal could easily determine the warning levels of obvious zones within a protected area and act accordingly; spending little time in zones having a high warning level, for example.

It is therefore an object of the present invention to provide a surveillance system which overcomes the problems of the prior art.

It is another object of the invention to provide such a surveillance system wherein a potentially abnormal event is determined by a computer prior to summoning a human supervisor.

It is another object of the invention to provide a surveillance system which compares specific measured movements of a particular person or persons with a trainable, predetermined set of "typical" movements to determine the level and type of criminal or mischievous event.

It is another object of this invention to provide a surveillance system which transmits the data from various sensors to a location where it can be recorded for evidentiary purposes. It is another object of this invention to provide such surveillance system which is operational day and night.

It is another object of this invention to provide a surveillance system which can cull out real-time events which indicate criminal intent using a weapon, by resolving the low temperature of the weapon relative to the higher body temperature and by recognizing the stances taken by the person with the weapon.

It is yet another object of this invention to provide a surveillance system which does not require "real time" observation by human personnel.

INCORPORATED BY REFERENCE

The content of the following references is hereby incorporated by reference.

1. Motz L. and L. Bergstein "Zoom Lens Systems", Journal of Optical Society of America, 3 papers in Vol. 52, 1992.

2. D. G. Aviv, "Sensor Software Assessment of Advanced Earth Resources Satellite Systems", ARC Inc. Report #70-80-A, pp2-107 through 2-119; NASA contract NAS-1-16366.
3. Shio, A. and J. Sklansky "Segmentation of People in Motion", Proc. of IEEE Workshop on Visual Motion, Princeton, N.J., October 1991.
4. Agarwal, R. and J Sklansky "Estimating Optical Flow from Clustered Trajectory Velocity Time".
5. Suzuki, S. and J Sklansky "Extracting Non-Rigid Moving Objects by Temporal Edges", IEEE, 1992, Transactions of Pattern Recognition.
6. Rabiner, L. and Biing-Hwang Juang "Fundamental of Speech Recognition", Pub. Prentice Hall, 1993, (p.434-495).
7. Weibel, A. and Kai-Fu Lee Eds. "Readings in Speech Recognition", Pub. Morgan Kaaufman, 1990 (p.267-296).
8. Rabiner, L. "Speech Recognition and Speech Synthesis Systems", Proc. IEEE, January, 1994.

SUMMARY OF THE INVENTION

A surveillance system having at least one primary video camera for translating real images of a zone into electronic video signals at a first level of resolution;

means for sampling movements of an individual or individuals located within the zone from the video signal output from at least one video camera;

means for electronically comparing the video signals of sampled movements of the individual with known characteristics of movements which are indicative of individuals having a criminal intent;

means for determining the level of criminal intent of the individual or individuals;

means for activating at least one secondary sensor and associated recording device having a second higher level of resolution, said activating means being in response to determining that the individual has a predetermined level of criminal intent.

A method for determining criminal activity by an individual within a field of view of a video camera, said method comprising:

sampling the movements of an individual located within said field of view using said video camera to generate a video signal;

electronically comparing said video signal of said with known characteristics of movements that are indicative of individuals having a criminal intent;

determining the level of criminal intent of said individual, said determining step being dependent on said electronically comparing step; and generating a signal indicating a predetermined level of criminal intent is present as determined by said determining step.

BRIEF DESCRIPTION OF THE DRAWINGS

FIG. 3A illustrates a frame of a video camera's output, according to the invention, showing a "two on one" interaction of objects (people) A, B, and C;

FIG. 3B illustrates a later frame of the video camera's output of FIG. 3A, according to the invention, showing objects A and C moving towards object B;

FIG. 3C illustrates a later frame of the video camera's output of FIG. 3B, according to the invention, showing objects A and C moving in close proximity to object B;

FIG. 3D illustrates a later frame of the video camera's output of FIG. 3C, according to the invention, showing objects A and C quickly moving away from object B.

DETAILED DESCRIPTION OF THE PREFERRED EMBODIMENTS

Figure 1:
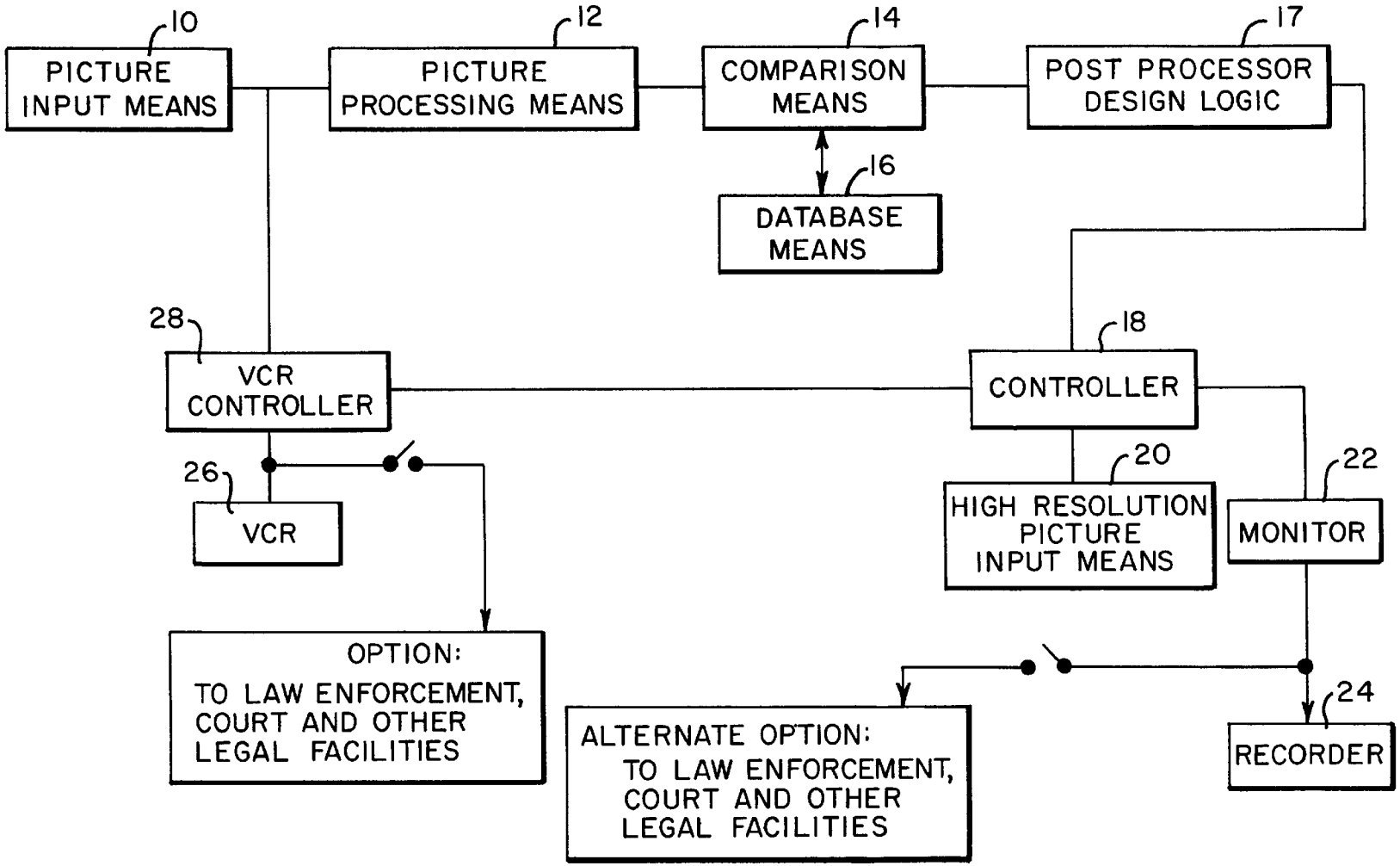
FIG. 1 is a schematic block diagram of the video, analysis, control, alarm and recording subsystems embodying this invention.
Figure 2A:
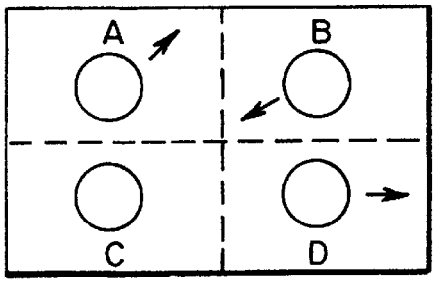
FIG. 2A illustrates a frame K of a video camera's output of a particular environment, according to the invention, showing four representative objects (people) A, B, C, and D, wherein objects A, B and D are moving in a direction indicated with arrows, and object C is not moving.
Figure 2B:
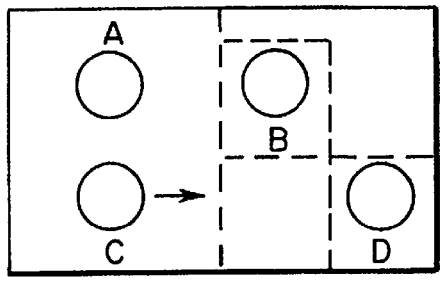
FIG. 2B illustrates a frame K+5 of the video camera's output, according to the invention, showing objects A, B, and D are stationary, and object C is moving.
Figure 2C:
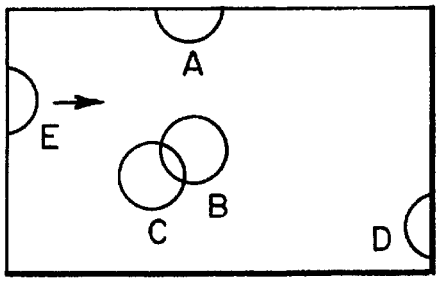
FIG. 2C illustrates a frame K+10 of the video camera's output, according to the invention, showing the current location of objects A, B, C, D, and E.
Figure 2D:
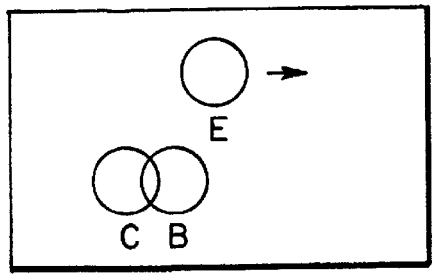
FIG. 2D illustrates a frame K+11 of the video camera's output, according to the invention, showing object B next to object C, and object E moving to the right.
Figure 2E:
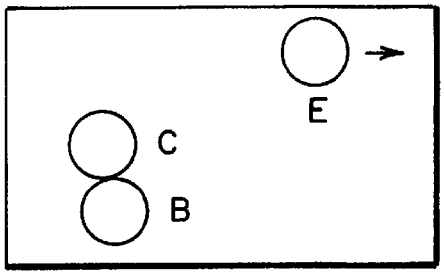
FIG. 2E illustrates a frame K+12 of the video camera's output, according to the invention, showing a potential crime taking place between objects B and C.
Figure 2F:
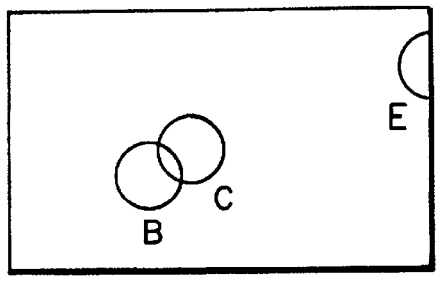
FIG. 2F illustrates a frame K+13 of the video camera's output, according to the invention, showing objects B and C interacting.
Figure 2G:
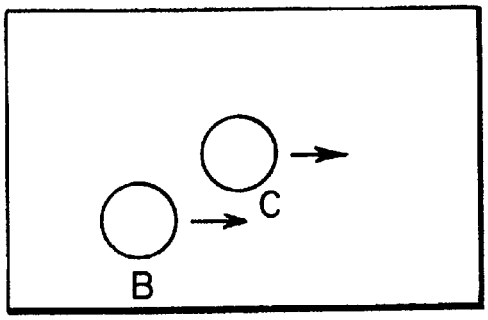
FIG. 2G illustrates a frame K+15 of the video camera's output, according to the invention, showing object C moving to the right and object B following.
Figure 2H:
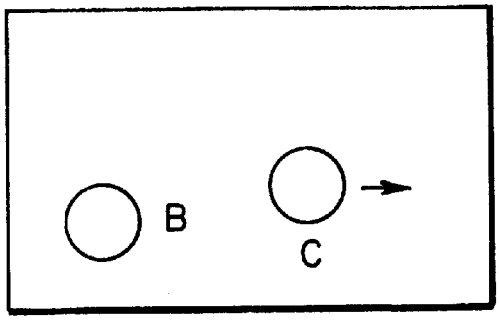
FIG. 2H illustrates a frame K+16 of the video camera's output, according to the invention, showing object C moving away from a stationary object B.
Figure 2I:
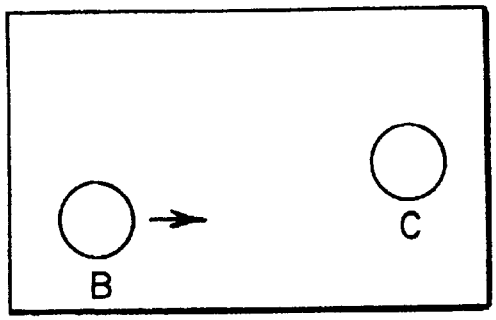
FIG. 2I illustrates a frame K+17 of the video camera's output, according to the invention, showing object B moving towards object C.

Referring to FIG. 1, the basic elements of one embodiment of the invention are illustrated, including picture input means 10, which may be any conventional electronic picture pickup device operational within the infrared or visual spectrum (or both) including a vidicon and a CCD/TV camera (including the wireless type).

In another embodiment of picture input means 10, there is the deployment of a high rate camera/recorder (similar to those made by NAC Visual Systems of Woodland Hills, Calif., SONY and others). Such high rate camera/recorder systems are able to detect and record very rapid movements of body parts that are commonly indicative of a criminal intent. Such fast movements might not be resolved with a more standard 30 frames per second camera. However, most movements will be resolved with a standard 30 frames per second camera.

This picture means, may also be triggered by an alert signal from the processor of the low resolution camera or, as before, from the audio/word recognition processor when sensing a suspicious event.

In this first embodiment, the primary picture input means 10 is preferably a low cost video camera wherein high resolution is not necessary and due to the relative expense will most likely provide only moderate resolution. ((The preferred CCD/TV camera is about 1½ inches in length and about 1 inch in diameter, weighing about 3 ounces, and for particular deployment, a zoom lens attachment may be used). This device will be operating continuously and will translate the field of view ("real") images within a first observation area into conventional video electronic signals.

In another embodiment of picture input means 10, a high rate camera/recorder, (similar to those made by NAC Visual Systems of Woodland Hills, Calif., SONY and others) is used, which would then enable the detection of even the very rapid movement of body parts that are indicative of criminal intent, and their recording. The more commonly used camera operates at 30 frames per second will be able to resolve essentially all quick body movements.

The picture input means may also be activated by an "alert" signal from the processor of the low resolution camera or from the audio/word recognition processor when sensing a suspicious event.

The picture input means for any embodiment contains a preprocessor which normalizes a wide range of illumination levels, especially for outside observation. The preprocessor to emulates a vertebrate's retina, which has an efficient and accurate normalization process. One such preprocessor (VLSI retina chip) is fabricated by the Carver Meade Laboratory of the California Institute of Technology in Pasadena, Calif. Use of this particular preprocessor chip will increase the automated vision capability of this invention whenever variation of light intensity and light reflection may otherwise weaken the picture resolution.

The signals from the picture input means 10 are converted into digitized signals and then sent to the picture processing means 12.

The processor controlling each group of cameras will be governed by an artificial intelligence system, based on dynamic pattern recognition principles, as further described below.

The picture processing means 12 includes an image raster analyzer which effectively segments each image to isolate each pair of people.

The image raster analyzer subsystem of picture processing means 12 segments each sampled image to identify and isolate each pair of objects (or people), and each "two on one" group of 3 people separately.

The "2 on 1" represents a common mugging situation in which two individuals approach a victim: one from in front of the victim and the other from behind. The forward mugger tells the potential victim that if he does not give up his money, (or watch, ring, etc.) the second mugger will shoot him, stab or otherwise harm him. The group of three people will thus be considered a potential crime in progress and will therefore be segmented and analyzed in picture processing means.

An additional embodiment of the picture means 1 is the inclusion of an optics system known as the zoom lens system. The essentials of the zoom lens subsystem are described in three papers written by L. Motz and L. Bergstein, in an article titled "Zoom Lens Systems" in the Journal of Optical Society of America, Vol. 52, April, 1992. This article is hereby incorporated by reference.

The essence of the zoom system is to vary the focal length such that an object being observed will be focused and magnified at its image plane. In an automatic version of the zoom system once an object is in the camera's field-of-view (FOV), the lens which moves to focus the object onto the camera's image plane. An error which is used to correct the focus, by the image planes's is generated by CCD array into 2 halves and measuring the difference segmenting in each until the object is at the center. Dividing the CCD array into more than 2 segments, say 4 quadrants is a way to achieve automatic centering, as is the case with mono-pulse radar. Regardless of the number of segments, the error signal is used to generate the desired tracking of the object.

In a wide field-of-view (WFOV operation, there may be more than one object, thus special attention is given to the design of the zoom system and its associated software and firmware control. Assuming 3 objects, as is the "2 on 1" potential mugging threat described above, and that the 3 persons are all in one plane, one can program a shifting from one object to the next, from one face to another face, in a prescribed sequential order. Moreover, as the objects move within the WFOV they will be automatically tracked in azimuth and elevation. In principle, the zoom would focus on the nearest object, assuming that the amount of light on each object is the same so that the prescribed sequence starting from the closes object will proceed to the remaining objects from, for example, right to left.

However, when the 3 objects are located in different planes, but still within the camera's WFOV, the zoom, with input from the segmentation subsystem of the picture analysis means 12 will focus on the object closest to the right hand side of the image plane, and then proceed to move the focus to the left, focusing on the next object and on the next sequentially.

In all of the above cases, the automatic zoom can more naturally choose to home-in on the person with the brightest emission or reflection, and then proceed to the next brightness and so forth. This would be a form of an intensity/time selection multiplex zoom system.

The relative positioning of the input camera with respect to the area under surveillance will effect the accuracy by which the image raster analyzer segments each image. In this preferred embodiment, it is beneficial for the input camera to view the area under surveillance from a point located directly above, e.g., with the input camera mounted high on a wall, a utility tower, or a traffic light support tower. The height of the input camera is preferably sufficient to minimize occlusion between the input camera and the movement of the individuals under surveillance.

Once the objects within each sampled video frame are segmented (i.e., detected and isolated), an analysis is made of the detailed movements of each object located within each particular segment of each image, and their relative movements with respect to the other objects.

Each image frame segment, once digitized, is stored in a frame by frame memory storage of section 12. Each frame from the camera input 10 is subtracted from a previous frame already stored in memory 12 using any conventional differencing process. The differencing process involving multiple differencing steps takes place in the differencing section 12. The resulting difference signal (outputted from the differencing sub-section 12) of each image indicates all the changes that have occurred from one frame to the next. These changes include any movements of the individuals located within the segment and any movements of their limbs, e.g., arms.

A collection of differencing signals for each moved object of subsequent sampled frames of images (called a "track") allows a determination of the type, speed and direction (vector) of each motion involved and also processing which will extract acceleration, i.e., note of change of velocity: and change in acceleration with respect to time (called "jerkiness") and will when correlating with stored signatures of known physical criminal acts. For example, subsequent differencing signals may reveal that an individual's arm is moving to a high position, such as the upper limit of that arm's motion, i.e., above his head) at a fast speed. This particular movement could be perceived, as described below, as a hostile movement with a possible criminal intent requiring the expert analysis of security personnel.

The intersection of two tracks indicates the intersection of two moved objects. The intersecting objects, in this case, could be merely the two hands of two people greeting each other, or depending on other characteristics, as described below, the intersecting objects could be interpreted as a fist of an assailant contacting the face of a victim in a less friendly greeting. In any event, the intersection of two tracks immediately requires further analysis and/or the summoning of security personnel. But the generation of an alarm, light and sound devices located, for example, on a monitor will turn a guard's attention only to that monitor, hence the labor savings. In general however, friendly interactions between individuals is a much slower physical process than is a physical assault vis-a-vis body parts of the individuals involved. Hence, friendly interactions may be easily distinguished from hostile physical acts using current low pass and high pass filters, and current pattern recognition techniques based on experimental reference data.

When a large number of sensors are distributed over a large number facilities, for example, a number of ATMs (automatic teller machines), associated with particular bank branches and in a particular state or states and all operated under a single bank network control on a time division multiplexed basis, then only a single monitor is required.

A commercially available software tool may enhance object-movement analysis between frames (called optical flow computation). (see ref. 3 and 4) With optical flow computation, specific (usually bright) reflective elements, called farkles, emitted from the clothing and/or the body parts of an individual of one frame are subtracted from a previous frame. The bright portions will inherently provide sharper detail and therefore will yield more accurate data regarding the velocities of the relative moving objects. Additional computation, as described below, will provide data regarding the acceleration and even change in acceleration or "jerkiness" of each moving part sampled.

The physical motions of the individuals involved in an interaction, will be detected by first determining the edges of the of each person imaged. And the movements of the body parts will then be observed by noting the movements of the edges of the body parts of the (2 or 3) individuals involved in the interaction.

The differencing process will enable the determination of the velocity and acceleration and rate of acceleration of those body parts.

The now processed signal is sent to comparison means 14 which compares selected frames of the video signals from the picture input means 10 with "signature" video signals stored in memory 16. The signature signals are representative of various positions and movements of the body ports of an individual having various levels of criminal intent. The method for obtaining the data base of these signature video signals in accordance with another aspect of the invention is described in greater detail below.

If a comparison is made positive with one or more of the signature video signals, an output "alert" signal is sent from the comparison means 14 to a controller 18. The controller 18 controls the operation of a secondary, high resolution picture input means (video camera) 20 and a conventional monitor 22 and video recorder 24. The field of view of the secondary camera 20 is preferably at most, the same as the field of view of the primary camera 10, surveying a second observation area. The recorder 24 may be located at the site and/or at both a law enforcement facility (not shown) and simultaneously at a Court office or legal facility to prevent loss of incriminating information due to tampering.

The purpose of the secondary camera 20 is to provide a detailed video signal of the individual having assumed criminal intent and also to improve false positive and false negative performance. This information is recorded by the video recorder 24 and displayed on a monitor 22. An alarm bell or light (not shown) or both may be provided and activated by an output signal from the controller 20 to summon a supervisor to immediately view the pertinent video images showing the apparent crime in progress and access its accuracy.

In still another embodiment of the invention, a VCR 26 is operating continuously (using a 6 hour loop-tape, for example). The VCR 26 is being controlled by the VCR controller 28. All the "real-time" images directly from the picture input means 10 are immediately recorded and stored for at least 6 hours, for example. Should it be determined that a crime is in progress, a signal from the controller 18 is sent to the VCR controller 28 changing the mode of recording from tape looping mode to non-looping mode. Once the VCR 26 is changed to a non-looping mode, the tape will not re-loop and will therefore retain the perhaps vital recorded video information of the surveyed site, including the crime itself, and the events leading up to the crime.

When the non-looping mode is initiated, the video signal may also be transmitted to a VCR located elsewhere; for example, at a law enforcement facility and, simultaneously to other secure locations of the Court and its associated offices.

Prior to the video signals being compared with the "signature" signals stored in memory, each sampled frame of video is "segmented" into parts relating to the objects detected therein. To segment a video signal, the video signal derived from the vidicon or CCD/TV camera is analyzed by an image raster analyzer. Although this process causes slight signal delays, it is accomplished nearly in real time.

At certain sites, or in certain situations, a high resolution camera may not be required or otherwise used. For example, the resolution provided by a relatively simple and low cost camera may be sufficient. Depending on the level of security for the particular location being surveyed, and the time of day, the length of frame intervals between analyzed frames may vary. For example, in a high risk area, every frame from the CCD/TV camera may be analyzed continuously to ensure that the maximum amount of information is recorded prior to and during a crime. In a low risk area, it may be preferred to sample perhaps every 10 frames from each camera, sequentially. If, during such a sampling, it is determined that an abnormal or suspicious event is occurring, such as two people moving very close to each other, then the system would activate an alert mode wherein the system becomes "concerned and curious" in the suspicious actions and the sampling rate is increased to perhaps every 5 frames or even every frame. As described in greater detail below, depending on the type of system employed (i.e., video only, audio only or both), during such an alert mode, the entire system may be activated wherein both audio and video system begin to sample the environment for sufficient information to determine the intent of the actions.

Referring to FIG. 2, several frames of a particular camera output are shown to illustrate the segmentation process performed in accordance with the invention. The system begins to sample at frame K and determines that there are four objects (previously determined to be people, as described below), A-D located within a particular zone being policed. Since nothing unusual is determined from the initial analysis, the system does not warrant an "alert" status. People A, B, and D are moving according to normal, non-criminal intent, as could be observed.

A crime likelihood is indicated when frames K+10 through K+13 are analyzed by the differencing process. And if the movement of the body parts indicate velocity, acceleration and "jerkiness" that compare positively with the stored digital signals depicting movements of known criminal physical assaults, it is likely that a crime is in progress here.

Additionally, if a large velocity of departure is indicated when person C moves away from person B, as indicated in frames K+15 through K+17, a larger level of confidence, is attained in deciding that a physical criminal act has taken plate or is about to.

An alarm is generated the instant any of the above conditions is established. This alarm condition will result in sending in Police or Guards to the crime site, activating the high resolution CCD/TV camera to record the face of the person committing the assault, a loud speaker being activated automatically, playing a recorded announcement warning the perpetrator the seriousness of his actions now being undertaken and demanding that he cease the criminal act. After dark a strong light will be turned on automatically. The automated responses will be actuated the instant an alarm condition is adjudicated by the processor. Furthermore, an alarm signal is sent to the police station and the same video signal of the event, is transmitted to a court appointed data collection office, to the Public Defender's office and the District Attorney's Office.

As described above, it is necessary to compare the resulting signature of physical body parts motion involved in a physical criminal act, that is expressed by specific motion characteristics (i.e., velocity, acceleration, change of acceleration), with a set of signature files of physical criminal acts, in which body parts motion are equally involved. This comparison, is commonly referred to as pattern matching and is part of the pattern recognition process.

The files of physical criminal acts, which involve body parts movements such as hands, arms, elbows, shoulder, head, torso, legs, and feet we obtained, a priority, by experiments and simulations of physical criminal acts gathered from "dramas" that are enacted by professional actors, the data gathered from experienced muggers who have been caught by the police as well as victims who have reported details of their experiences will help the actors perform accurately. Video of their motions involved in these simulated acts will be stored in digitized form and files prepared for each of the body parts involved, in the simulated physical criminal acts.

The present invention could be easily implemented at various sites to create effective "Crime Free" zones. In another embodiment, the above described Abnormality Detection System includes an RF-ID (Radio Frequency Identification) tag, to assist in the detection and tracking of individuals within the field of view of a camera.

I.D. cards or tags are worn by authorized individuals. The tags response when queried by the RF Interrogator. The response signal of the tags propagation pattern which is adequately registered with the video sensor. The "Tags" are sensed in video are assumed friendly and authorized. This information will simplify the segmentation process.

A light connected to each RF-ID card will be turned ON, when a positive response to an interrogation signal is established. The light will appear on the computer generated grid (also on the screen of the monitor) and the intersection of tracks clearly indicated, followed by their physical interaction. But also noted will be the intersection between the tagged and the untagged individuals. In all of such cases, the segmentation process will be simpler.

There are many manufacturers of RF-ID cards and Interrogators, three major ones are, The David Sarnoff Research Center of Princeton, N.J., AMTECH of Dallas, Tex. and MICRON Technology of Boise, Id.

The applications of the present invention include stationary facilities: banks and ATMs, hotels, private residence halls and dormitories, high rise and low rise office and residential buildings, public and private schools from kindergarten through high-school, colleges and universities, hospitals, sidewalks, street crossing, parks, containers and container loading areas, shipping piers, train stations, truck loading stations, airport passenger and freight facilities, bus stations, subway stations, move houses, theaters, concert halls and arenas, sport arenas, libraries, churches, museums, stores, shopping malls, restaurants, convenience stores, bars, coffee shops, gasoline stations, highway rest stops, tunnels, bridges, gateways, sections of highways, toll booths, warehouses, and depots, factories and assembly rooms, law enforcement facilities including jails.

Further applications of the invention include areas of moving platforms: automobiles, trucks, buses, subway cars, train cars, freight and passenger, boats and ships (passenger and freight, tankers, service vehicles, construction vehicles, on and off-road, containers and their carriers, and airplanes. And also in military applications that will include but will not be limited to assorted military ground, sea, and air mobile vehicles and assorted military ground, sea, and air mobile vehicles and platforms as well as stationary facilities where the protection of low, medium, and high value targets are necessary; such targets are common in the military but have equivalents in the civilian areas wherein this invention will serve both sectors.

As a deterrence to car-jacking a tiny CCD/TV camera connected surreptitiously at the ceiling of the car, or in the rear-view mirror, through a pin hole lens and focused at the driver's seat, will be connected to the video processor to record the face of the drive. The camera is triggered by the automatic word recognition processor that will identify the well known expressions commonly used by the car-jacker. The video picture will be recorded and then transmitted via cellular phone in the car. Without a phone, the short video recording of the face of the car-jacker will be held until the car is found by the police, but now with the evidence (the picture of the car-jacker) in hand.

In this present surveillance system, the security personnel manning the monitors are alerted only to video images which show suspicious actions (criminal activities) within a prescribed observation zone. The security personnel are therefore used to access the accuracy of the crime and determine the necessary actions for an appropriate response. By using computers to effectively filter out all normal and noncriminal video signals from observation areas, fewer security personnel are required to survey and "secure" a greater overall area (including a greater number of observation areas, i.e., cameras).

It is also contemplated that the present system could be applied to assist blind people "see". A battery operated portable version of the video system would automatically identify known objects in its field of view and a speech synthesizer would "say" the object. For example, "chair", "table", etc. would indicate the presence of a chair and a table.

Depending on the area to be policed, it is preferable that at least two and perhaps three cameras (or video sensors) are used simultaneously to cover the area. Should one camera sense a first level of criminal action, the other two could be manipulated to provide a three dimensional perspective coverage of the action. The three dimensional image of a physical interaction in the policed area would allow observation of a greater number of details associated with the steps: accost, threat, assault, response and post response. The conversion from the two dimensional image to the three dimensional image is known as "random transform".

In the extended operation phase of the invention as more details of the physical variation of movement characteristics of physical threats and assaults against a victim and also the speaker independent (male, female of different ages groups) and dialect independent words and terse sentences, with corresponding responses, will enable automatic recognition of a criminal assault, without he need of guard, unless required by statutes and other external requirements.

In another embodiment of the present invention, both video and acoustic information is sampled and analyzed. The acoustic information is sampled and analyzed in a similar manner to the sampling and analyzing of the above-described video information. The audio information is sampled and analyzed in a manner shown in FIG. 4, and is based on prior art. (references 6 and 7).

The employment of the audio speech band, with its associated Automatic Speech Recognition (ASR) system, will not only reduce the false alarm rate resulting from the video analysis, but can also be used to trigger the video and other sensors if the sound threat predates the observed threat.

Figure 4:
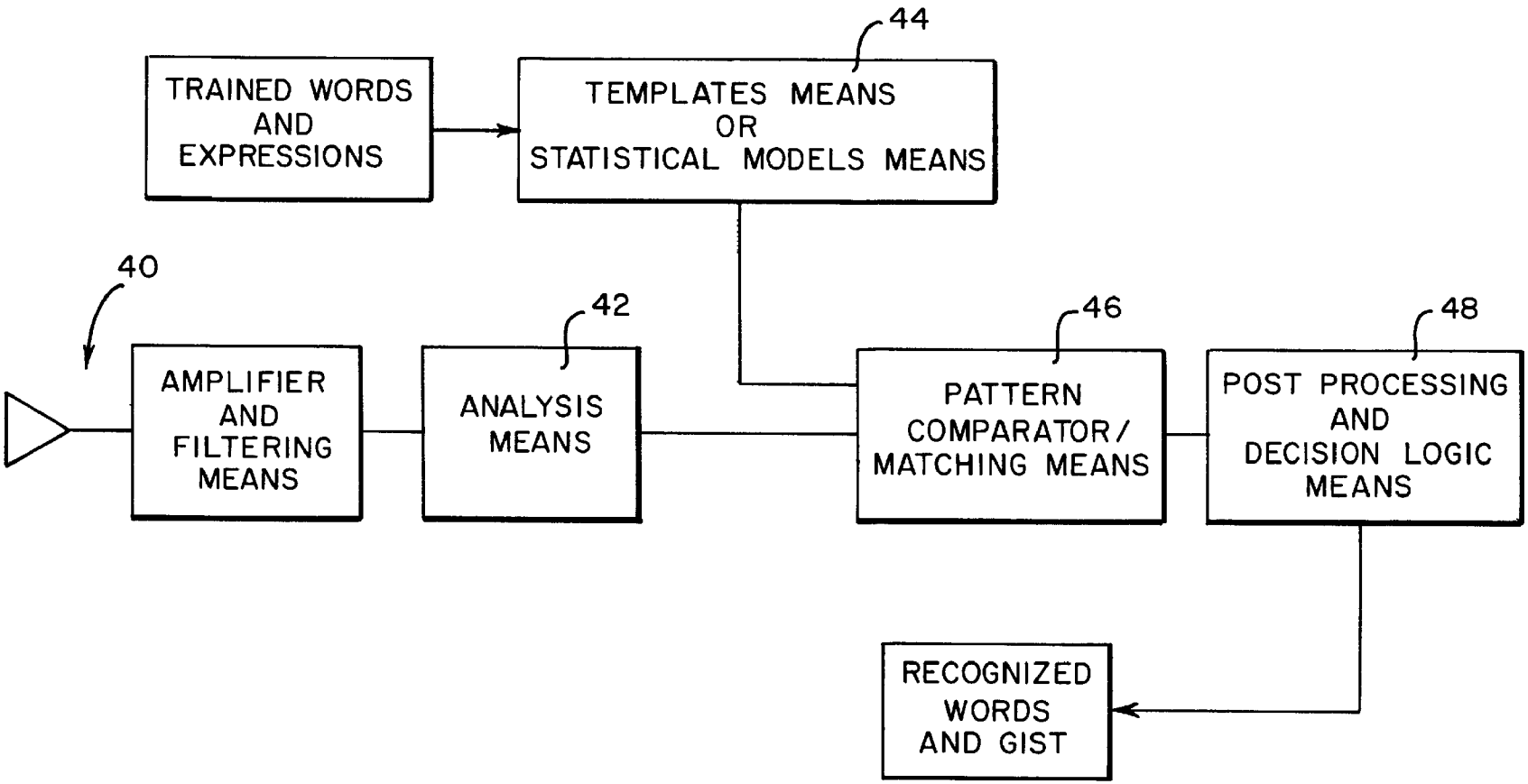
FIG. 4 is a schematic block diagram of a conventional word recognition system.

Referring to FIG. 4, a conventional automatic word recognition system is shown, including an input microphone system 40, an analysis subsystem 42, a template subsystem 44, a pattern comparator 46, and a post-processor and decision logic subsystem 48.

In operation, upon activation, the acoustic/audio policing system will begin sampling all (or a selected portion) of nearby acoustic signals. The acoustic signals will include voices and background noise. The background noise signals are generally known and predictable, and may therefore be easily filtered out using conventional filtering techniques. Among the expected noise signals are unfamiliar speech, automotive related sounds, honking, sirens, the sound of wind and/or rain.

The microphone input system 40 pick-up the acoustic signals and immediately filter out the predictable background noise signals and amplify the remaining recognizable acoustic signals. The filtered acoustic signals are analyzed in the analysis subsystem 42 which processes the signals by means of digital and spectral analysis techniques. The output of the analysis subsystem is compared in the pattern comparater subsystem 46 with selected predetermined words stored in memory in 44. The post processing and decision logic subsystem 48 generates an alarm signal, as described below.

The templates 44 include perhaps about 100 brief and easily recognizable terse expressions, some of which are single words, and are commonly used by those intent on a criminal act. Some examples of commonly used word phrases spoken by a criminal to a victim prior to a mugging, for example, include: "Give me your money", "This is a stick-up", "Give me your wallet and you won't get hurt" . . . etc. Furthermore, commonly used replies from a typical victim during such a mugging may also be stored as template words, such as "help", and certain sounds such as shrieks, screams and groans, etc.

The specific word templates, from which inputted acoustic sounds are compared with, must be chosen carefully, taking into account the particular accents and slang of the language spoken in the region of concern (e.g., the southern cities of the U.S. will require a different template 44 than the one used for a recognition system in the New York City region of the U.S.).

The output of the word recognition system shown in FIG. 4 is used as a trigger signal to activate a sound recorder, or a camera used elsewhere in the invention, as described below.

The preferred microphone used in the microphone input subsystem 40 is a shotgun microphone, such as those commercially available from the Sennheiser Company of Frankfurt, Germany. These microphone have a super-car-dioid propagation pattern. However, the gain of the pattern may be too small for high traffic areas and may therefore require more than one microphone in an array configuration to adequately focus and track in these areas. The propagation pattern of the microphone system enables better focusing on a moving sound source (e.g., a person walking and talking). A conventional directional microphone may also be used in place of a shot-gun type microphone, such as those made by the Sony Corporation of Tokyo, Japan. Such directional microphones will achieve similar gain to the shot-gun type microphones, but with a smaller physical structure.

A feedback loop circuit (not specifically shown) originating in the post processing subsystem 48 will direct the microphone system to track a particular dynamic source of sound within the area surveyed by video cameras.

An override signal from the video portion of the present invention will activate and direct the microphone system towards the direction of the field of view of the camera. In other words, should the video system detect a potential crime in progress, the video system will control the audio recording system towards the scene of interest. Likewise, should the audio system detect words of an aggressive nature, as described above, the audio system will direct appropriate video cameras to visually cover and record the apparent source of the sound.

A number of companies have developed very accurate and efficient, speaker independent word recognition systems based on a hidden Markov model (HMM) in combination with an artificial neural network (ANN). These companies include IBM of Armonk, N.Y., AT&T Bell Laboratories, Kurtzweil of Cambridge, Mass. and Lernout and Hauspie of Belgium.

Put briefly, the HMM system uses probability statistics to predict a particular spoken word following recognition of a primary word unit, syllable or phoneme. For example, as the word "money" is inputted into an HMM word recognition system, the first recognized portion of the word is "mon . . . ". The HMM system immediately recognizes this word stem and determines that the spoken word could be "MONDAY", "MONopoly", or "MONey", etc. The resulting list of potential words is considerably shorter than the entire list of all spoken words of the English language. Therefore, the HMM system employed with the present invention allows both the audio and video systems to operate quickly and use HMM probability statistics to predict future movements or words based on an early recognition of initial movements and word stems.

The HMM system may be equally employed in the video recognition system. For example, if a person's arm quickly moves above his head, the HMM system may determine that there is a high probability that the arm will quickly come down, perhaps indicating a criminal intent.

The above-described system actively compares input data signals from a video camera, for example, with known reference data of specific body movements stored in memory. In accordance with the invention, a method of obtaining the "reference data" (or ground truth data) is described. This reference data describes threats, actual criminal physical acts, verbal threats and verbal assaults, and also friendly physical acts and friendly words, and neutral interactions between interacting people.

According to the invention, the reference data may be obtained using any of at least the following described three methods including a) attaching accelerometers at predetermined points (for example arm and leg joints, hips, and the forehead) of actors; b) using a computer to derive 3-D models of people (stored in the computer's memory as pixel data) and analyze the body part movements of the people; and c) scanning (or otherwise downloading) video data from movie and TV clips of various physical and verbal interactions into a computer to analyze specific movements and sounds.

While the above-identified three approaches should yield similar results, the preferred method for obtaining reference data is includes attaching accelerometers to actors while performing various actions or "events" of interest: abnormal (e.g., criminal or generally quick, violent movements), normal (e.g., shaking hands, slow and smooth movements), and neutral behavior (e.g., walking).

In certain environments, in particular where many people are moving in different directions, such as during rush hour in the concourse of Grand Central Station or in Central Park, both located in New York City, it may prove very difficult to analyze the specific movements of each person located within the field of view of a surveillance camera. To overcome the analyzing burden in these environments, according to another embodiment of the invention, the people located within the environment are provided personal ID cards that include an electronic radio frequency (rf) transmitter. The transmitter of each radio-frequency identification card (RFID) transmits an rf signal that identifies the person carrying the card. Receivers located in the area of a surveillance camera can receive the identification information and use it to help identify the different people located within the field of the near by surveillance camera (or microphone, in the case of audio analysis). In one possible arrangement, people may be issued an RFID card prior to entering a particular area, such as a U.S. Tennis Open event. In such instance, a clearance check would be made for each person prior to them receiving such a card. Once within the secure area, surveillance cameras would associate card-holders as less likely to cause trouble and would be suspicious of anyone within the field of the camera's view not being identified by an RFID card.

As described above, the basic configuration of the invention (as shown in FIGS. 1 and 2) uses video and audio sensors (such as, respectively, a camera and a microphone), and potentially other active and passive sensing and processing devices and systems (including the use of radar and ladar and other devices that operate in all areas of the electromagnetic spectrum) to detect threats and actual criminal acts occurring with a field of view of a camera (a video sensor). The system described above, and according to the invention, initially requires the collection of "reference values" which correspond to specific known acts of threat, actual assault (both physical and verbal), and other physical and verbal interactions that are considered friendly or neutral. Video components of recorded "reference data" is stored in a physical movement dictionary (or data base), while audio components of such reference data is stored in a verbal utterance dictionary (or data base).

In operation of the earlier described system, real time (or "fresh") data is inputted into the system through one sensor (such as a video camera) and immediately compared to the reference data stored in either or both data bases. As described above, a decision is made based on a predetermined algorithm. If it is determined that the fresh input data compares closely with a known hostile action or threat, an alarm is activated to summon law enforcement. Simultaneously, a recording device is activated to record the hostile event in real time.

The above-described reference data is preferably obtained through the use of actors performing specific movements of hostility, threats, and friendly and neutral actions and other actors performing neutral actions of greetings and also simulating a victim's response to acts of aggression, hostility and friendship. According to the invention, accelerometers are connected to specific points of the actors' bodies. Depending on the particular actions being performed by the actors, the accelerometers may be attached to various parts of their bodies, such as the hands, lower arms, elbows, upper arms, shoulders, top of each foot, the lower leg and thigh, the neck and head. Of course other parts of the actors' bodies may similarly support an accelerometer, and some of the ones mentioned above may not be needed to record a particular action.

The accelerometers may be attached to the particular body joint or location using a suitable tape or adhesive and may further include a transmitter chip that transmits a signal to a multi-channel receiver located nearby, and a selected electronic filter that helps minimize transmission interference. Alternatively, all accelerometer or a selected group may be hard wired on the actor's body and interconnected to a local master receiver. The data derived from each accelerometer as the actor performs and moves his/her body, includes the instantaneous acceleration of the particular body part, the change of acceleration (the jerkiness of the movement), and, through integration processing, the velocity and position at any given time. These signals (collectively called "JAVP") are processed by known mathematical operators: FFT (fast Fourier transform), cosine transform or wavelets, and then stored in a matrix format for comparison with the same processed "fresh" data, as described above. The JAVP data is collectively placed into a data base (image dictionary). The image dictionary includes signatures of the threat and actual assault movements of the attacker and of the response movement of the victim, paying particular attention to the movements of the attacker.

In making the "reference data", the weight or size of each actor is preferably taken into account. For example, ten actors representing attackers preferably vary in weight (or size) from 220 lbs. to 110 lbs. with commonly associated heights. Similarly, ten actors representing victims are selected. The twenty actors then perform a number (perhaps 100) choreographed skits or actions that factor the size difference between an attacker and a victim according to the movement of the body part, acceleration, change of acceleration, and velocity for hostile, friendly, and neutral acts. An example of an neutral act may be two people merely walking past each other without interaction.

Once an initial set of JAVP data is generated through the use of actors carrying accelerometers, as described above, further JAVP data may be generated simply by recording actors performing specific actions using a conventional video sensor (such as a video camera). In this case, the same physical acts involved in the same skits or performances are carried out by the actor aggressors and actor victims, but are simply recorded by a video camera, for example. The JAVP data is transformed using only image processing techniques. A matrix format memory is again generated using the JAVP data and compared to each of the corresponding body part signatures derived using the accelerometers as in the above-described case. In doing this, similarities and the closeness of the signatures of each body part for each type of movement may be categorized: hostile (upper cut, kicking, drawing a knife, etc), friendly (shaking hands, waving, etc.), and neutral (walking past each other or standing in a line). Modifications may be made to each of these signatures in order to obtain more accurate reference signatures, according to people of different size and weight.

If the differences between the video-only JAVP data and the accelerometer JAVP data is more than a predetermined amount, the performances by the actors would be repeated until the difference between the two signatures is understood (by the actors) and corrections made.

The difference between the accelerometer and video sensor signatures based on input of same physical movements, bounds the range of incremental change for the reference signatures.

Typically accompanying each of the hostile, friendly, and neutral acts performed by the actors, spoken words and expressions are verbalized by the attacker and by the victim. This audio-detection system includes a word-spotting/recognition and word gisting system, according to the invention, which analyzes specific words, inflections, accents, and dialects and detect spoken words and expressions that indicate hostile actions, friendly actions, or neutral ones.

The audio-detection system uses a shotgun-type microphone of a microphone array to achieve a high gain propagation pattern and further preferably employs appropriate noise reduction systems and common mode rejection circuitry to achieve good audio detection of the words and oral expressions provided by the attacker and the victim.

Word recognition and word gisting software engines are commercially available which may easily handle the relatively few words and expressions typically used during such a hostile interaction. The attacker's and the victims reference words and word gisting of a hostile nature are stored in a verbal dictionary, as are those of friendly and neutral interactions.

Figure 5:
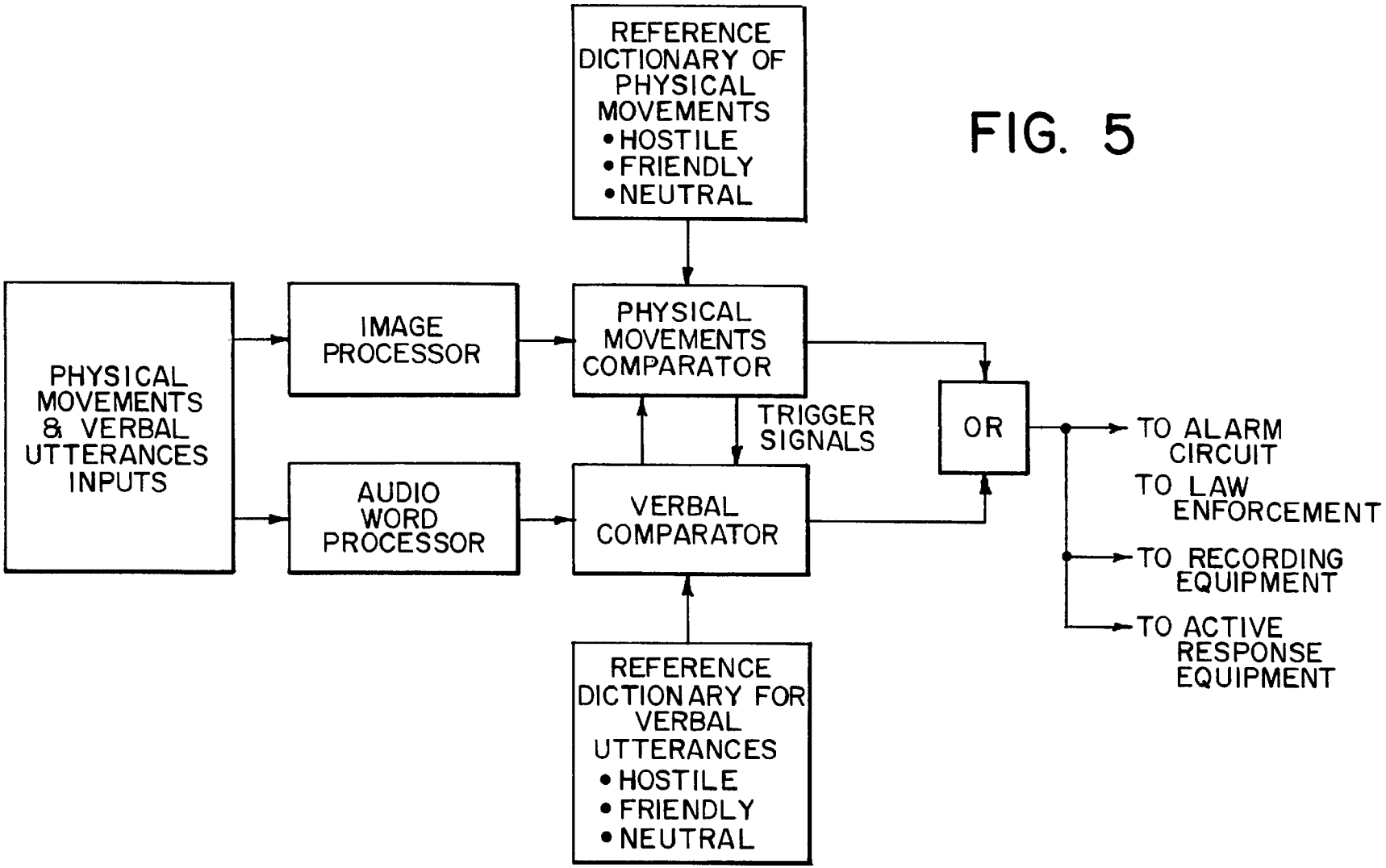
FIG. 5 is a schematic block diagram of a video and verbal

Referring to FIG. 5, in operation, according to this embodiment of the invention, physical movements and verbal utterances of people in a field of view of an area under surveillance are recorded by an appropriate video camera and microphone. Image data from the camera is processed (e.g., filtered), as described above and compared to image data stored within the reference image dictionary, which is compiled in a manner described above. Similarly, audio information from the microphone is processed (filtered) and compared with known verbal utterances from the reference verbal dictionary, which is compiled in a manner described above.

If either an image or a verbal utterance matches (to a predetermined degree) a known image or verbal utterance of hostility, then an alarm is activated and recording equipment is turned on.

An alternate approach using the above-described accelerometer technique for obtaining the reference JAVP signals associated with hostle, friendly and neutral actions is to employ doppler radar, operating at very short wavelengths, imaging radar (actually an inverse synthetic aperture radar), also operating at very short wavelengths, or laser radar. It is preferred that these active devices be operated at very low power to prevent undesireable exposure of transmitted energy to the people located within an area of transmission. Among the benefits of using any of the above-listed active sensors is their ability to detect and analyze movements of selected body parts at a distance, in darkness (e.g., at night), and depending on the range, through inclement weather.

What is claimed is:

1. A method for determining criminal activity by an individual within a field of view of [a] *at least one* video camera, said method comprising:

sampling [the] *relative* movements*, from one or more images captured by said at least one video camera of said field of view,* of an individual *with respect to a moved, movable or moving object* located within said field of view using said *at least one* video camera to generate a video signal;

electronically comparing said video signal of said *at least one* video camera with known characteristics of *relative* movements *of the individual with respect to the object* that are indicative of an individual having criminal intent;

determining the level of criminal intent of said individual, said determining step being dependent on said electronically comparing step; and generating a signal indicating that a predetermined level of criminal intent is present as determined by said determining step.

*2. A method according to claim 1, wherein sampling the relative movements of an individual comprises:*

*generating a field of view video signal of the individual within the field of view of the video camera; and*

*sampling the relative movements of the individual with respect to the object in the field of view video signal.*

*3. The method according to claim 1, wherein the object is another individual.*

*4. A non-transitory computer-readable information storage media having stored thereon instructions, that if executed by a processor, cause to be performed the steps of claim 1.*

*5. The method according to claim 1, wherein the individual is associated with a personal ID card.*

*6. A method for determining criminal activity by an individual within a field of view of at least one video camera, the method comprising:*

*generating, using said at least one video camera, a video signal of the individual within the field of view of the at least one video camera;*

*sampling a relative movement, from one or more images captured by said at least one video camera of said field of view, of the individual with respect to a moved, movable or moving object captured by said at least one video camera of said field of view;*

*electronically comparing the sampled relative movement of the individual with known characteristics of movements that are indicative of an individual having criminal intent;*

*determining a level of criminal intent of the individual based on the compared sampled movement of the individual; and*

*generating a signal indicating that a predetermined level of criminal intent is present if the determined level of criminal intent of the individual establishes that the predetermined level of criminal intent is present.*

*7. The method according to claim 6, wherein the relative movement of the individual with respect to the object comprises an arm movement, a leg movement, an arm joint movement, a leg joint movement, an elbow movement, a shoulder movement, a head movement a torso movement, a hand movement, a foot movement, or combinations thereof, of the individual.*

*8. The method according to claim 7, wherein sampling the relative movement of the individual with respect to the object further comprises sampling an edge of an arm, a leg, an elbow, a shoulder, a head, a torso, a hand, a foot, or combinations thereof, of the individual.*

*9. The method according to claim 6, wherein electronically comparing the sampled relative movement of the individual with respect to the object with known characteristics of movements that are indicative of an individual having criminal intent comprises correlating a track of the sampled relative movement to known characteristics of movements that are indicative of an individual having criminal intent.*

*10. The method according to claim 6, wherein determining the level of criminal intent of the individual further comprises*

*detecting an intersection of a second track from a second individual with the track from the individual.*

*11. The method according to claim 6, wherein electronically comparing the sampled relative movement of the individual with respect to an object with known characteristics of movements that are indicative of an individual having criminal intent comprises pattern matching of the sampled relative movement to known movements that are indicative of an individual having criminal intent.*

*12. The method according to claim 6, wherein determining the level of criminal intent of the individual comprises detecting a speed, a direction, a jerkiness, or combinations thereof, of the sampled relative movements of the individual with respect to the object.*

*13. The method according to claim 12, wherein determining the level of criminal intent of the individual further comprises detecting a change of velocity, a change in acceleration, a jerkiness, or combinations thereof, of the sampled relative movements of the individual with respect to the object.*

*14. The method according to claim 6, wherein determining the level of criminal intent of the individual further comprises detecting a change of velocity, a change in acceleration, a jerkiness, or combinations thereof, of the sampled relative movements of the individual with respect to the object.*

*15. The method according to claim 6, wherein the video signal of the individual generated within the field of view of the video camera comprises a first resolution,*

*the method further comprising generating a second video signal of the individual within the field of view of a second video camera, the video signal comprising a second resolution, the first resolution being lower than the second resolution.*

*16. The method according to claim 6, further comprising:*

*generating an audio signal of the individual;*

*sampling the audio signal of the individual; and*

*electronically comparing the sampled audio signal of the individual with known characteristics of sounds that are indicative of an individual having criminal intent, and*

*wherein determining the level of criminal intent of the individual is further based on a result of electronic comparing of the sampled audio signal of the individual with the known characteristics of sounds that are indicative of an individual having criminal intent.*

*17. The method according to claim 16, wherein determining the level of criminal intent of the individual comprises detecting a speed, a direction, a jerkiness, a change of velocity, a change in acceleration, or a combination thereof, of the sampled relative movements of the individual with respect to the object.*

*18. The method according to claim 16, wherein the video signal of the individual generated within the field of view of the video camera comprises a first resolution,*

*the method further comprising generating a second video signal of the individual within the field of view of a second video camera, the video signal comprising a second resolution, the first resolution being lower than the second resolution.*

*19. The method according to claim 6, wherein determining the level of criminal intent of the individual further comprises detecting one or more of a recognized word and a recognized expression.*

*20. The method according to claim 6, wherein the object comprises at least one body part of the individual or at least one identified object.*

*21. The method according to claim 20, wherein the at least one body part of the individual comprises a hand, an arm, an elbow, a shoulder, a head, a torso, a leg or a foot.*

*22. The method according to claim 20, wherein the object comprises a weapon.*

*23. The method according to claim 6, further comprising controlling a second video camera in response to the signal indicating that a predetermined level of criminal intent is present.*

*24. The method according to claim 6, wherein the sampled relative movement of the individual with respect to the object comprises a movement of the object with respect to the individual, a lack of a movement of the object with respect to the individual, a jerkiness of motion of the object with respect to the individual, or a jerkiness of motion of an individual with respect to the object, or combinations thereof.*

*25. The method according to claim 6, further comprising sensing the relative movement of the individual using ladar or radar.*

*26. The method according to claim 6, wherein determining the level of criminal intent of the individual further comprises determining the temperature difference between the individual and the object.*

*27. The method according to claim 6, wherein sampling the relative movement of the individual with respect to the object further comprises sampling an edge of an arm, a leg, an elbow, a shoulder, a head, a torso, a hand, a foot, or combinations thereof, of the individual.*

*28. The method according to claim 6, wherein the object is another individual.*

*29. A non-transitory computer-readable information storage media having stored thereon instructions, that if executed by a processor, cause to be performed the steps of claim 6.*

*30. The method according to claim 6, wherein the individual is associated with a personal ID card.*

*31. The method according to claim 1, wherein the individual is associated with a RFID card.*

*32. The method according to claim 6, wherein the individual is associated with a RFID card.*

*33. The method of claim 31, wherein the RFID card identifies the individual.*

*34. The method of claim 32, wherein the RFID card identifies the individual, and the object not identified by a second RFID card.*

*35. The method of claim 6, wherein the individual is not identified by an RFID card.*

*36. The method of claim 1, wherein the object is detected and isolated.*

*37. The method of claim 6, wherein the object is detected and isolated.*

*38. The method of claim 1, further comprising a segmentation step.*

*39. The method of claim 6, further comprising a segmentation step.*

*40. A non-transitory computer-readable information storage media having stored thereon instructions, that if executed by a processor, cause to be performed the steps of claim 16.*

*41. A non-transitory computer-readable information storage media having stored thereon instructions, that if executed by a processor, cause to be performed the steps of claim 3.*

*42. A non-transitory computer-readable information storage media having stored thereon instructions, that if executed by a processor, cause to be performed the steps of claim 28.*

* * * * *